United States Patent
Tsfasman et al.

(10) Patent No.: US 11,392,365 B2
(45) Date of Patent: Jul. 19, 2022

(54) OPTIMIZING DEVICE UPDATE SCHEDULING

(71) Applicant: International Business Machines Corporation, Armonk, NY (US)

(72) Inventors: Arkadiy O. Tsfasman, Wappingers Falls, NY (US); Dane Warren, Highland, NY (US); Charles Bene, Poughkeepsie, NY (US); Tadd Bindas, Ringoes, NJ (US); Syed F. Hossain, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/120,747

(22) Filed: Dec. 14, 2020

(65) Prior Publication Data
US 2022/0188090 A1     Jun. 16, 2022

(51) Int. Cl.
*G06F 8/65* (2018.01)
*G06F 9/50* (2006.01)
*G06F 8/61* (2018.01)

(52) U.S. Cl.
CPC .......... *G06F 8/65* (2013.01); *G06F 8/61* (2013.01); *G06F 9/505* (2013.01); *G06F 9/5033* (2013.01)

(58) Field of Classification Search
USPC ........................................... 717/168
See application file for complete search history.

(56) References Cited

U.S. PATENT DOCUMENTS

| | | | |
|---|---|---|---|
| 6,199,204 B1 | 3/2001 | Donohue | |
| 6,976,251 B2 | 12/2005 | Meyerson | |
| 8,966,304 B1* | 2/2015 | Tabone | G06F 1/329 713/323 |
| 9,804,901 B2 | 10/2017 | Gambardella | |
| 10,460,324 B1 | 10/2019 | Westen | |
| 2006/0026304 A1* | 2/2006 | Price | G06F 8/65 710/8 |
| 2007/0192763 A1 | 8/2007 | Helvick | |

(Continued)

FOREIGN PATENT DOCUMENTS

| | | |
|---|---|---|
| EP | 32854591 A1 | 2/2018 |
| WO | 2016144297 A1 | 9/2016 |

OTHER PUBLICATIONS

Jeff Gamet; "Setting an Automatic Software Update Schedule"; MacObserver.com website [full url in ref.]; 2007 (Year: 2007).*

(Continued)

*Primary Examiner* — Wei Y Zhen
*Assistant Examiner* — Clint Thatcher
(74) *Attorney, Agent, or Firm* — Erika R. DeCosty

(57) ABSTRACT

A computer-implemented method for updating a device is disclosed. The computer-implemented method includes identifying that an update associated with the device is available. The computer-implemented method further includes determining whether the available update associated with the device is permitted. The computer-implemented method further includes determining, in response to the available update associated with the device being permitted, an optimal scheduled time for performing the update on the device. The computer-implemented method further performing the update on the device at the scheduled time.

16 Claims, 9 Drawing Sheets

(56) References Cited

U.S. PATENT DOCUMENTS

| | | | |
|---|---|---|---|
| 2009/0187899 A1 | 7/2009 | Mani | |
| 2011/0004678 A1* | 1/2011 | Rothrock | G06F 8/65 709/223 |
| 2013/0346955 A1 | 12/2013 | Cudak | |
| 2014/0059534 A1 | 2/2014 | Daum | |
| 2014/0237476 A1 | 8/2014 | Steffen | |
| 2016/0216959 A1 | 7/2016 | Kurian | |
| 2017/0147322 A1* | 5/2017 | Vopni | G06F 8/65 |
| 2020/0120639 A1 | 4/2020 | Zuo | |
| 2020/0348923 A1* | 11/2020 | Mezaael | H04W 4/40 |

OTHER PUBLICATIONS

"Application Update Control"; An IP.com Prior Art Database Technical Disclosure (No. IPCOM000158769D); 2007 (Year: 2007).*

"App Store", Apple Developer, downloaded from the internet on Oct. 14, 2020, 6 pages, <https://developer.apple.com/support/app-store/>.

"Apple Reports First Quarter Results", Apple, Press Release Jan. 29, 2019, 8 pages, <https://www.apple.com/newsroom/2019/01/apple-reports-first-quarter-results/>.

"Apple Reports Record First Quarter Results", Apple, Press Release, Jan. 28, 2020, 7 pages, <https://www.apple.com/newsroom/2020/01/apple-reports-record-first-quarter-results/>.

"Cisco Telepresence Management Suite", Cisco, Administrator Guide, Last Updated: Sep. 2019, Software Version 15.6.1, 316 pages.

"Distribution dashboard | Android Developers", downloaded from the Internet on Oct. 14, 2020, 3 pages, <https://developer.android.com/about/dashboards/index.html>.

"Improved Software Update Management", An IP.com Prior Art Database Technical Disclosure, Authors et. al.: Disclosed Anonymously, IP.com No. IPCOM000218260D, IP.com Electronic Publication Date: May 30, 2012, 3 pages.

"Smart Task Planner", An IP.com Prior Art Database Technical Disclosure, Authors et al.: Disclosed Anonymously, IP.com No. IPCOM000257928D, IP.com Electronic Publication Date: Mar. 23, 2019, 4 pages.

"Smart Update Manager User Guide", Hewlett Packard Enterprise, Version 8.0.0, Part No. 881504-001, Published: Jul. 2017, Edition: 1, 122 pages.

"Smart Wallet", An IP.com Prior Art Database Technical Disclosure, Authors et al.: Disclosed Anonymously, IP.com No. IPCOM000255203D, IP.com Electronic Publication Date: Sep. 10, 2018, 24 pages.

"SOPHOS Enterprise Console", SOPHOS, Product version: 5.2.1, 5.2.2, Document date: Sep. 2014, 247 pages.

Haselton, Todd, "Apple is shifting investors' attention to the iPhone installed base instead of unit sales—here's why", Published Tue, Jan. 29, 2019, 6 pages, CNBC, <https://www.cnbc.com/2019/01/29/apple-will-report-iphone-installed-base-instead-of-unit-sales.html>.

Lardinois, Frederic, "Android now powers 2.5B devices", TechCrunch, May 7, 2019, 11 pages, <https://techcrunch.com/2019/05/07/android-now-has-2-5b-users/>.

Malchev, Lliyan, "All About Updates: More Treble", Android Developers Blog, Oct. 23, 2019, 6 pages, <https://android-developers.googleblog.com/2019/10/all-about-updates-more-treble.html>.

Mell et al., "The NIST Definition of Cloud Computing", Recommendations of the National Institute of Standards and Technology, NIST Special Publication 800-145, Sep. 2011, 7 pages.

O'Dea, S., "Smartphone ownership in the US by age 2015-2019", Statista, Sep. 7, 2020, 1 page, <https://www.statista.com/statistics/489255/percentage-of-us-smartphone-owners-by-age-group/>.

Foreign Search Report, Patents Act 1977: Combined Search and Examination Report under Sections 17 and 18(3), Application No. GB2117083.2, dated May 27, 2022.

* cited by examiner

OPTIMIZING DEVICE UPDATE SCHEDULING

BACKGROUND

The present invention relates generally to the field of updating devices, and more particularly to optimizing scheduling software and firmware updates.

A software update modifies, fixes, or alters any current software program on a computer, hand-held mobile device, or smart appliance. Software updates typically involve small improvements rather than major changes. Software updates can address any new security issues, software bugs, or problems with the existing software. Oftentimes, software updates are necessary for a device to continue running without software issues. Keeping up with software updates ensure a device is running the most up to date software. While smaller software updates can occur when the device in need of the update is in use by the user, larger software updates may require that the device not be in use when performing the software update.

A firmware update is a software program used to update the firmware of a user device. A firmware update will upgrade a computing device with advanced operational instructions without the need to upgrade any of the hardware of the user device. Firmware updates are used to enhance the capabilities or fix issues for a computing device. Staying up to date on firmware updates enables a computing device to run efficiently.

SUMMARY

According to one embodiment of the present invention, a computer-implemented method for updating a device is disclosed. The computer-implemented method includes identifying that an update associated with the device is available. The computer-implemented method further includes determining whether the available update associated with the device is permitted. The computer-implemented method further includes determining, in response to the available update associated with the device being permitted, an optimal scheduled time for performing the update on the device. The computer-implemented method further performing the update on the device at the scheduled time.

According to another embodiment of the present invention, a computer program product for updating a device is disclosed. The computer program product includes one or more computer readable storage media and program instructions stored on the one or more computer readable storage media. The program instructions include instructions to identify that an update associated with the device is available. The program instructions further include instructions to determine whether the available update associated with the device is permitted. The program instructions further include instructions to determine, in response to the available update associated with the device being permitted, an optimal scheduled time for performing the update on the device. The program instructions further include instructions to perform the update on the device at the scheduled time.

According to another embodiment of the present invention, a computer system for updating a device is disclosed. The computer system includes one or more computer processors, one or more computer readable storage media, computer program instructions, the computer program instructions being stored on the one or more computer readable storage media for execution by the one or more computer processors. The program instructions include instructions to identify that an update associated with the device is available. The program instructions further include instructions to determine whether the available update associated with the device is permitted. The program instructions further include instructions to determine, in response to the available update associated with the device being permitted, an optimal scheduled time for performing the update on the device. The program instructions further include instructions to perform the update on the device at the scheduled time.

BRIEF DESCRIPTION OF DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

DETAILED DESCRIPTION

Figure 1:
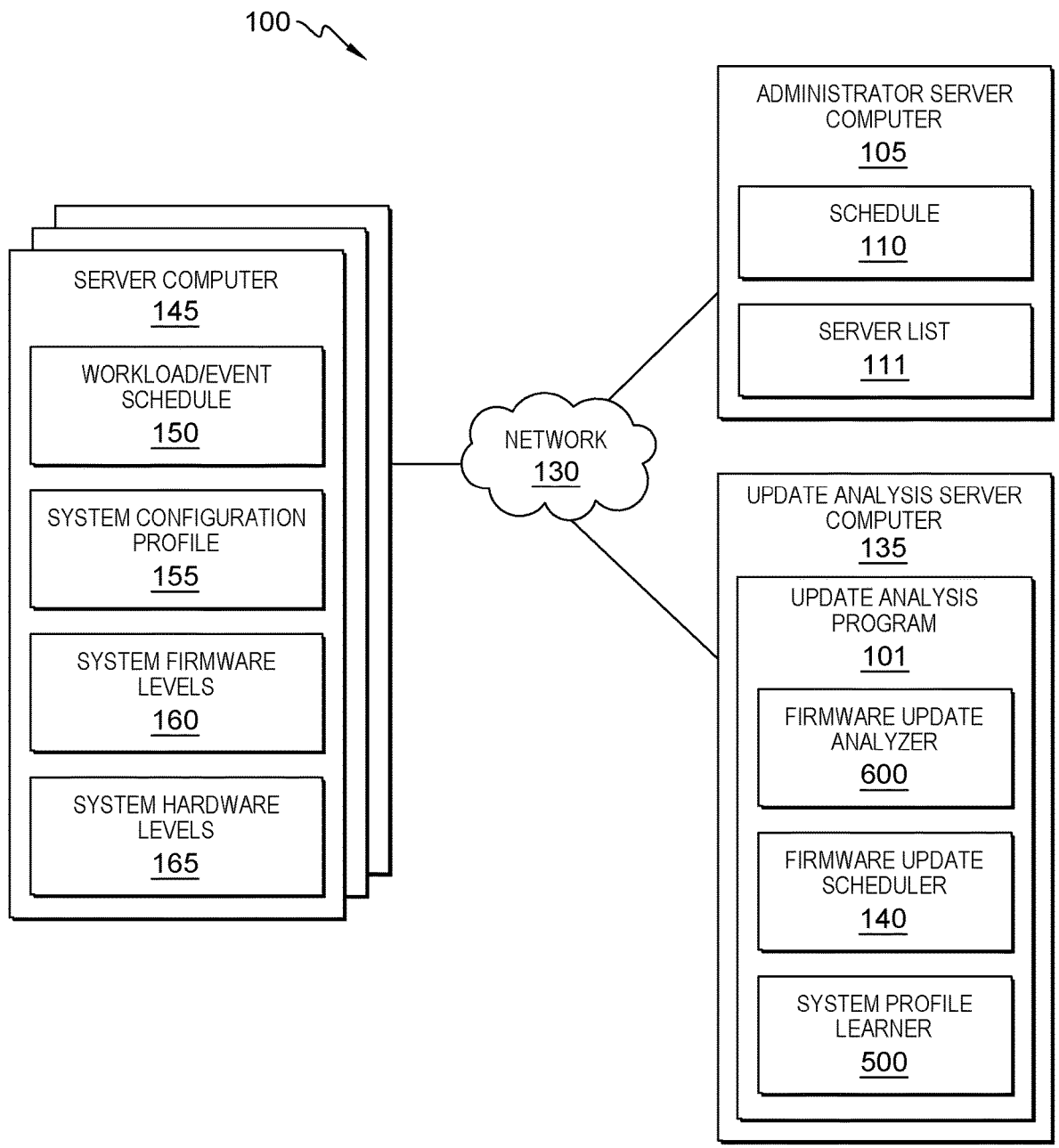
FIG. 1 is a functional block diagram of a network computing environment, generally designated 100, for scheduling an optimum time for a firmware update in accordance with at least one embodiment of the present invention.

The present invention relates generally to the field of updating devices, and more particularly to optimizing scheduling software and firmware updates.

New versions of software and firmware are periodically released to a user to fix minor problems, install new features, or otherwise alter the current software or firmware on a computing device, such as a server, laptop, hand-held mobile device, or smart appliance. Keeping up with software and firmware updates on a computing device is necessary to ensure the device is running the newest version or that the device is free from any bugs. If a user delays on updating their device, it can cause the device to lag, freeze, or behave in unintended ways, and thereby ultimately tamper with the user's experience. In some instances, software updates include security patches. In these instances, not keeping a device up to date on the latest software updates can expose the device to security breaches.

Small updates may be able to update in the background of the device while the device is in use by a user. Typically, larger updates require the device to turn off temporarily or restart, making the device temporarily unavailable to a user. Turning off or restarting a user device can be burdensome to a user and interfere with their work schedule. Due to this, many users put off completing updates on their devices. Generally, prompts on a user device can be used to remind the user to update their device's software or firmware immediately or at a user designated later point in time. Larger updates may also require the user device have a sufficient battery charge level while also being plugged into a charger.

Embodiments of the present invention recognize that determining the most convenient time to update a group of devices is difficult, especially for devices that are not tied to a single location and/or possess a rigid scheduled use. For example, if a user is currently using their device, updating the device immediately is likely burdensome on the user since they are currently in use of their device. Embodiments of the present invention further recognize that if a user plans to update their device's software at a scheduled time, when it comes time to update the device's software, the scheduled time may longer be conducive to the user. Similarly, some operating systems schedule automatic updates during general low usage hours that may be conducive for some users, but not others. The user may also simply forget to perform the update at the scheduled time, or a power source and/or power cable may not be readily available at the scheduled update time. Any of these scenarios may result in a user's device to become behind on software updates, thus leaving the device to possible security breaches and unintended performance issues.

Embodiments of the present invention further recognize the following problems or disadvantages with scheduling and performing system updates: (i) a user may not be knowledgeable enough or feel comfortable to perform system updates on their own, thereby requiring assistance from a more experienced person; (ii) some operating systems force updates without consulting the user, thereby potentially resulting in a loss of data and/or productivity; (iii) inexperienced users may not even be aware that updates are available and/or required; and (iv) important information may inadvertently be deleted if a device is not updated within a certain time threshold.

Embodiments of the present invention improve upon the foregoing deficiencies by analyzing a user's schedule to find an optimum and convenient time to schedule a software update. Embodiments of the present invention recognize many factors influence the optimum time for a software update. Accordingly, embodiments of the present invention analyze many factors including, but not limited to, a user's personal and work calendar, device battery charge level and/or device charge threshold, device screen time, network status, and Wi-Fi connectivity to determine and schedule an optimum time to proceed with a software update. In an embodiment, mutually available update times are determined for a plurality of interdependent devices. In an embodiment, available times for future device updates are learned based, at least in part, on past availability of devices for updates and past update times for a particular device(s).

Embodiments of the present invention further recognize that server computer updates are complicated on many different levels. Updates may force system downtime, require a user to re-log into a server computer, or may not even be compatible with a server. For example, if server hardware levels do not support the latest firmware updates, the server may be required to remain at the current, older version. Conversely, other servers may not require level firmware for the hardware levels installed in these servers. In another example, certain server computers under system-level testing may require a specific firmware level for verification. However, users of the server may not desire firmware updates for a particular stream of code, but do desire updates to other streams of code.

Embodiments of the present invention further recognize that scheduling server updates across a cluster of servers is both difficult and burdensome for a server computer administrator/IT team. For example, an update time may need to be determined for all computing devices of a data center to perform necessary/specific firmware updates on a single computing device in order to minimize downtime or impact on the workload of other devices. Furthermore, automatic updates may not even be an option due to different levels of updates required, the order that the updates must be executed, and the fact that certain updates may only apply to certain server computers. For example, on a system test floor, there may be multiple test corners focused on different functions that have various workload run times. During code releases and updates, there may be times where test teams do not need server updates or updates to all servers, patches unrelated to a testing focus, or patches that do not match particular hardware levels. Accordingly, embodiments of the present invention recognize a need for the automatic scheduling of machine updates for a server group that takes into account the particular workloads, availability, hardware levels, usability, and update requirements of the particular server of the server group.

Embodiments of the present invention provide one or more of the following features, characteristics, operations, and/or advantages: (i) managing code updates/patches for particular servers in a data center-like environment; (ii) identifying scheduled events along with system workload(s) to automatically determine optimum times to perform software updates/patches, thereby reducing system downtime; (iii) automatically updating various server computers based on server computer availability and firmware sub-stream update requirement(s) during system usage/testing; and (iv) automatically updating various server computers based on server computer availability and server hardware levels under test and usage (e.g., if a server computer has a down-level Ficon card that does not support a particular firmware update, then a different firmware update is identified that does not target the down-level Ficon card); and automatically scheduling and updating a server update based on system usage (co-dependence of other servers or computing devices requiring use of a particular server scheduled for an update), server computer availability, and firmware sub-stream update requirements.

The present invention may be a system, a method, and/or a computer program product at any possible technical detail level of integration. The computer program product may include a computer readable storage medium (or media) having computer readable program instructions thereon for causing a processor to carry out aspects of the present.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention will now be described in detail with reference to the Figures. FIG. 1 is a functional block diagram of a network computing environment, generally designated 100, for scheduling an optimum time for a firmware update in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the present invention as recited by the claims.

Computing system 100 includes administrator server computer 105, update analysis server computer 135, and server computers 145 interconnected over network 130. In various embodiments of the invention, each of administrator server computer 105, update analysis server computer 135, and server computer 145 are computing devices that can be a standalone device, a management server, a web server, a mobile device, or any other electronic device or computing system capable of receiving, sending, and processing data. In an embodiment, administrator server computer 100, update analysis server computer 135, and server computer 145 represent a server computing system utilizing multiple computers as a server system, such as in a cloud computing environment. In an embodiment, administrator server computer 100, update analysis server computer 135, and server computer 145 represent a computing system utilizing clustered computers and components (e.g. database server computers, application server computers, web server computers, etc.) that act as a single pool of seamless resources when accessed within network computing environment 100. In general, administrator server computer 105, update analysis server computer 135, and server computer 145 may represent any programmable electronic device or combination of programmable electronic devices capable of executing machine readable program instructions and communicating with each other and other devices (not depicted) within network computing environment 100 via a network, such as network 130.

Administrator server computer 105 includes administrator schedule 110 and server list 111. In an embodiment, administrator server computer 105 regulates updates for server computer 145. In an embodiment, administrator server computer 105 oversees the performance conditions and workloads of server computer 145. In an embodiment, administrator server computer 105 transmits updates to other servers in network 130, such as server computer 145. In an embodiment, administrator server computer 105 automatically and/or through a user administrator approves firmware updates to be dispatched to one or more server computer 145.

In an embodiment, schedule 110 contains information of administrator server computers 105 schedule. In an embodiment, schedule 110 contains information concerning the current and/or future workload of administrator server 105 with respect to updates performed on server computer 145. In an embodiment, schedule 110 contains information and times for other administrative tasks in addition to updates. For example, these administrative tasks may include various meetings, lunch break, appointments, or other events associated with a particular user having administrator privileges. In an embedment, schedule 110 contains information on the times from server list 111 of server computer 145 that server computer administrator 105 is responsible for will be subject to an update. In an embodiment, server list 111 contains a list of the server computers managed by server computer administrator 105.

In an embodiment, a priority value is assigned to server computers included in server list 111. For example, a higher priority value for a server computer would get placed prior to a server computer with a lower priority value to be updated on schedule 110. Meaning, a server computer with a higher priority value would be updated before a server computer with a lower priority value. In an embodiment, a priority value is based on determining the need of server computer 145 to perform a server update. For example, a server with firmware version 2.0 would have a higher need to be updated than a server with firmware version 2.1. In an embodiment, a priority value is determined by comparing the current firmware and the firmware update. In an embodiment, server list 111 is subject to change over time by either adding or removing a server computer 145 managed by server computer administrator 105.

Update analysis server 135 includes update analysis program 101, which further includes firmware update analyzer 600, firmware update scheduler 140, and system profile learner 500. In an embodiment, firmware update analyzer 600 is a module or sub-program of update analysis program 101 that analyzes firmware updates for server computer 145. In an embodiment, firmware update analyzer 600 combines information included in administrator schedule 110 with the availability information (described below in further detail with respect to FIG. 3) of one or more server computer 145 to determine whether a particular server computer 145 requires an update, and if an update is required, whether the update is permissible.

Firmware update scheduler 140 is a module or sub-program of update analysis program 101 that schedules firmware updates for one or more server computers 145. In an embodiment, firmware update scheduler 140 schedules and stores firmware update reminders within workload/event schedule 150 of server computer 145. In an embodiment, firmware update scheduler 140 schedules and stores firmware update reminders within schedule 110 of administrator server computer 105.

System profile learner 500 is a module or sub-program of update analysis program 101 that determines the respective system configuration profile 155 of server computer 145. In an embodiment, system profile learner 500 determines the firmware or hardware levels of server computer 145. In an embodiment, system profile learner 500 determines the available times of server computer 145 for performing updates. Further embodiments of system profile learner 500 are described in further detail below with respect to FIG. 2.

Server computer 145 includes workload/event schedule 150, system configuration profile 155, system firmware levels 160, and system hardware levels 165. In an embodiment, server computer 145 is managed by administrator server computer 105. In an embodiment, workload/event schedule 150 includes historical workload data associated with a particular server computer 145. In an embodiment, workload/event schedule 150 includes scheduled events, such as software or firmware updates, current and/or future workloads, and system downtimes associated with a particular server computer 145. In an embodiment, system configuration profile 155 includes respective configuration parameters for server computer 145. In an embodiment, system configuration profile 155 includes the hardware and firmware levels associated with a server computer 145. In an embodiment, update analysis program 101 identifies the firmware levels and hardware levels to determine if a server computer 145 requires a firmware update. In an embodiment, firmware levels requiring an update are determined based on a user prompt or predetermined invalid configurations. In an embodiment, if a firmware level cannot be patched, those firmware levels are stored in system configuration profile 155 as exceptions. In an embodiment, hardware levels requiring an update are determined based on a user prompt, predetermined invalid configurations or unsupported hardware. In an embodiment, if a hardware level cannot be patched, those hardware levels are stored in system configuration profile 155 as exceptions. In an embodiment, workload/event schedule 150 is included in system configuration profile 155.

In an embodiment, system configuration profile 155 includes rules for a particular server computer 145. Rules for server computer 145 may include the levels of firmware or hardware updates analysis program 101 should or should not update and the particular firmware or hardware levels that are or are not permitted to be updated. Rules for server computer 145 may be determined by the firmware or hardware requirements specific to a particular server computer 145.

In an embodiment, server computer 145 has multiple firmware levels. In an embodiment, firmware levels operate, manage, and control server computer 145. For example, server computer 145 contains an installed level, activated level, and an accepted level. Generally, an installed level of server firmware is installed and will be installed into memory after the managed system is powered off and powered on. An activated level is the level of server firmware or power subsystem firmware that is active and running in memory. An accepted level is the backup level of server or power subsystem firmware. Typically, an accepted firmware level is the level the server utilizes to remove the installed level. In an embodiment, system firmware levels 160 includes information on one or more of the installed levels, activated levels, or accepted levels.

In an embodiment, system hardware levels 165 includes low level or high-level hardware components. Generally, the hardware level of an operating system controls the use of physical system resources, for instance, the memory manager, process manager, and disk drivers. Hardware levels should not be upgraded if indicated by a user prompt, a predetermined invalid configuration, or unsupported hardware.

In various embodiments of the present invention, update analysis program 101 manages software updates or patches for a specific server computer in a data center environment. In an embodiment, update analysis program 101 determines a server update is required. In an embodiment, update analysis program 101 generates a configuration file as described in further detail below in accordance to FIG. 3. In an embodiment, update analysis program 101 utilizes firmware update analyzer 600 to determine an optimum time to schedule a server update. Update analysis program 101 uses firmware update scheduler 140 to update schedule 110 and server computer workload/event schedule 150 based on server computer configuration profile 155. In an embodiment, update analysis program 101 schedules an optimum server update time on schedule 110.

In an embodiment, administrator server computer 105 identifies scheduled events with the systems workload to determine optimal times to perform a firmware update or patch in order to reduce machine downtime. In an embodiment, administrator server computer 105 updates various server computer 145 based on the availability of one or more server computer 145, firmware sub stream update requirements, or system usage. In an embodiment, firmware sub stream update includes LPAR, OSA, CFCC (coupling), Power, and HMC/SE. In an embodiment, administrator server computer 105 updates various server computers 145 based on server computer availability and hardware levels. For example, if a server computer 145 does not support a firmware update, server computer 145 can use specific updates that do not target this down-level hardware.

In an embodiment, update analysis program 101 determines multiple optimum times for a server update. In these embodiments, update analysis program 101 assigns a score for each available time. In an embodiment, update analysis program 101 performs an update automatically on the servers at the scheduled optimum time based on prior learning from previous update attempts.

In an embodiment, update analysis program 101 determines there is not an overlap between workload/event schedule 150 and the schedule 110. For example, update analysis program 101 would determine there is not an overlap between the workload/event schedule 150 and the schedule 110 when either schedule indicates there is a calendar event at that time. Meaning if workload/event schedule 150 indicates there is an event on Jan. 4, 2020 from 3 pm-4 pm, update analysis program 101 will determine there is not overlap between the two schedules at Jan. 4, 2020 from 3 pm-4 pm. However, if both schedules indicate that on Jan. 4, 2020 from 4 pm-5 pm there are no calendar events scheduled, update analysis program 101 will indicate there is an overlap between workload/event schedule 150 and the schedule 110. If no overlapping time is initially indicated, update analysis program 101 increases the amount of overlap time. For example, if update analysis program 101 determined there were no overlapping available times on January $4^{th}$, update analysis program 101 then increases the overlap time to two days to determine if there are overlapping available times on January $4^{th}$ and January $5^{th}$.

Figure 2:
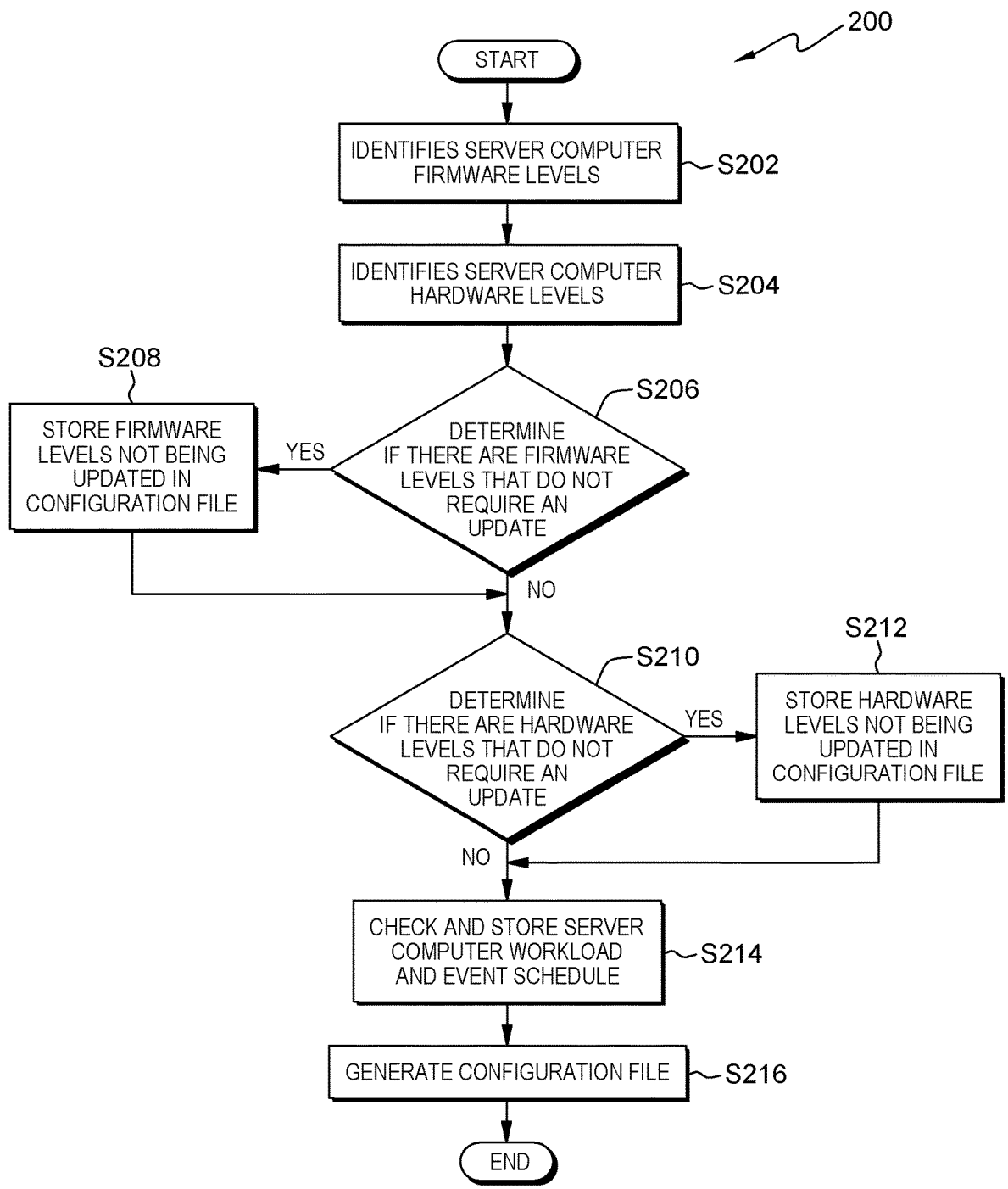
FIG. 2 is a flow chart diagram depicting operational steps for generating a configuration file in accordance with at least one embodiment of the present invention.

FIG. 2 is a flow chart diagram, generally designated 200, depicting operational steps for generating a system configuration file in accordance with at least one embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

At step S202, update analysis program 101 identifies server computer firmware levels. For example, update analysis program 101 identifies the server computers embedded software instructions to identify the server computer firmware levels. In an embodiment, the identified firmware levels are stored in a configuration file, such as system configuration file 155. In an embodiment, firmware levels are automatically queried from specific firmware configuration files and operating system configuration schemes on server computer 145. In an embodiment, firmware levels of server computer 145 are input into system configuration profile 155 manually by a user having administrator privileges.

At step S204, update analysis program 101 identifies server computer hardware levels. For example, update analysis program 101 identifies the server computers embedded software instructions to identify the server computer hardware levels. In an embodiment, the identified hardware levels are stored in a configuration file, such as system configuration file 155. In an embodiment, hardware levels are automatically queried from specific hardware configuration files and operating system configuration schemes on server computer 145. In an embodiment, hardware levels of server computer 145 are input into system configuration profile 155 manually by a user having administrator privileges.

At decision step S206, update analysis program 101 determines if there are firmware levels that do not require an update. In an embodiment, update analysis program 101 determines that a particular firmware level for a particular server computer 145 should not be updated based on, but not limited to, one or more of a user prompt, predetermined invalid configurations, and unsupported firmware. For example, it may be determined a firmware update is not required if the current firmware levels do not support the new update. For example, firmware levels may be required to remain unchanged in a server test environment to simulate a specific client operation to potentially reproduce a specific issue. For example, if a client encountered a problem with their firmware previously, firmware levels should remain unchanged to reproduce the previous problem. If it is determined that there are firmware levels that require an update (decision step S206 "YES" branch), update analysis program 101 proceeds to step S208. If it is determined that there are no firmware levels that require an update (decision step S206 "NO" branch), update analysis program 101 proceeds to decision step S210.

At step S208, update analysis program 101 stores information about which particular firmware levels for a server computer that require updating and which particular firmware levels for a server computer that do not require updating and/or should not be updated in the configuration file.

At decision step S210, update analysis program 101 determines if there are hardware levels that do not require an update. In an embodiment, update analysis program 101 may determine that a particular level of a piece of hardware for a particular server computer 145 should not be updated based on, but not limited to, one or more of a user prompt, predetermined invalid configurations, and unsupported hardware. For example, predetermined invalid hardware configurations may include the system recourse settings that are assigned to a specific device. In an embodiment, unsupported hardware may be that the physical hardware within the system cannot support the update. In an embodiment, when future unreleased prototype levels of hardware are being tested in server computer 145, the specific prototype hardware may be prevented from being updated with current released levels of firmware to prevent the hardware from failing. If it is determined that there are hardware levels that require an update (decision step S210"YES" branch), update analysis program 101 proceeds to step S212. If it is determined that there are no hardware levels that require an update (decision step S210 "NO" branch), update analysis program 101 proceeds to step S214.

At step S212, update analysis program 101 stores information about which particular hardware levels for a server computer that require updating and which particular hardware levels for a server computer that do not require updating and/or should not be updated in the configuration file.

At step S214, update analysis program 101 retrieves and stores the server computer workload/event schedule 150 in system configuration file 155.

At step S216, update analysis program 101 generates a configuration file.

Figure 3:
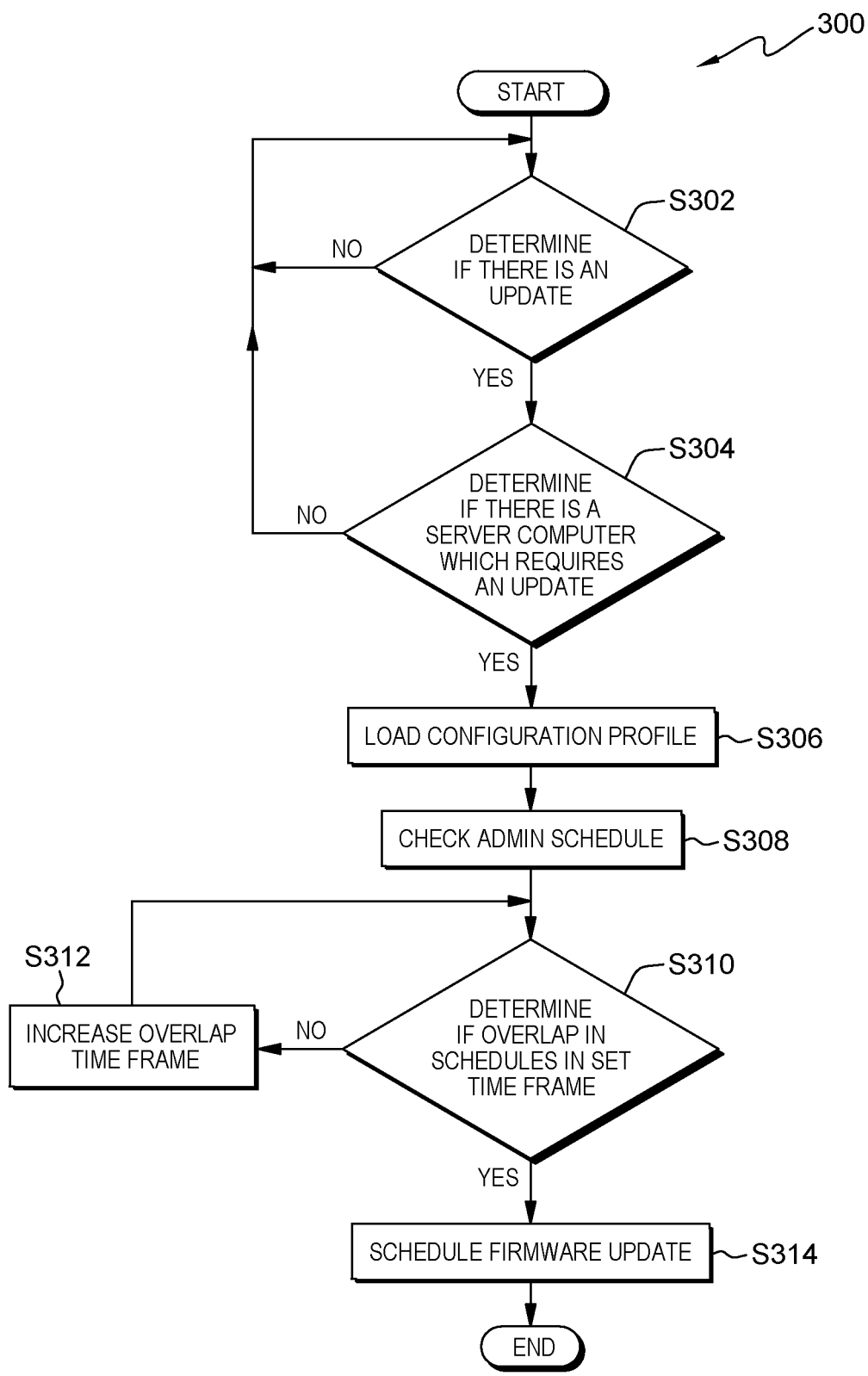
FIG. 3 is a flow chart diagram depicting operational steps for scheduling a firmware update in accordance with at least one embodiment of the present invention.

FIG. 3 is a flow chart diagram, generally designated 300, depicting operational steps for scheduling a firmware update in accordance with at least one embodiment of the present invention. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

At decision step S302, update analysis program 101 determines if there is an update available for a server computer, such as server computer 145. If it is determined that there is not an update available (decision step S302 "NO" branch), update analysis program 101 returns to the beginning of the operational steps. If it is determined that there is an update available (decision step S302 "YES" branch), update analysis program 101 proceeds to decision step S304.

At decision step S304, update analysis program 101 determines if there is a server computer which requires an update. In an embodiment, update analysis program 101 determines whether a server computer requires an update based on, but not limited to, one or more of a user prompt, predetermined invalid configurations, and unsupported firmware. In an embodiment, update analysis program 101 compares the current firmware levels of each server computer to the most recent update to determine if a server computer is running an outdated version. If it is determined that there is not a server computer which requires an update (decision step S304 "NO" branch), update analysis program 101 returns to the beginning of the operational steps. If it is determined that there is a server computer which requires an update (decision step S304 "YES" branch), update analysis program 101 proceeds to step S306.

At step S306, update analysis program 101 loads a system configuration profile associated with the server computer. For example, update analysis program 101 loads system configuration profile 155 generated for a particular server computer 145 in accordance with FIG. 2 above.

At step S308, update analysis program 101 determines if there is an overlap in schedules in set time frame. In an embodiment, update analysis program 101 compares server computer administrator schedule 110 to server computer workload/event schedule 150 to determine overlapping available times for performing an update within a predetermined time frame. If it is determined there is not an overlap in schedules in set time frame (decision step S310 "NO" branch), update analysis program 101 proceeds to step S312. If it is determined there is an overlap in schedules in set time frame (decision step S310 "YES" branch), update analysis program 101 proceeds to step S314.

At step S312, update analysis program 101 increases the predetermined time frame for performing the update. In an embodiment, update analysis program 101 can increase the amount of time in the time frame. For example, if update analysis program 101 detects not long enough consecutive periods of time for both server computer 145 and server computer administrator 105 to complete the update, then the acceptable period of time in which the update can be performed is increased to determine if there is an overlap between the devices at another future period of time. If it is determined the future period of time for which an update is to be completed is increased and no acceptable overlapping period of time to complete the update is found, update analysis program 101 may perform a force update on server computer 145.

At step S314, update analysis program 101 schedules a firmware update. In an embodiment, update analysis program 101 schedules the update for one or more server computers 145 based on comparing admin schedule 110 and respective server computer workload/event schedules 150 for the one or more server computer 145 that require the update. In an embodiment, update analysis program 101 schedules the update based for one or more server computers 145 based on comparing admin schedule 110 and respective server computer workload/event schedules of all server computers 145 to determine a firmware scheduling time for one or more server computers 145 that requires the update. For example, although only one server computer 145 may require an update, other server computers 145 may be dependent on the particular server computer 145 that requires the update. Accordingly, an overlapping time for completing the update is determined based on administrator schedule 110 of administrator server computer 105, the particular server computer 145 that requires the update, and one or more additional server computers 145 that may be dependent on the particular server computer 145 that requires the update to find a time that minimizes the effect of updating a server computer on those other dependent server computers. In an embodiment, one or more of server computers 145 are updated at once with update analysis program 101. It should be appreciated the steps of FIG. 3 may be repeated in order to determine if additional server computers 145 require the available update.

Figure 4:
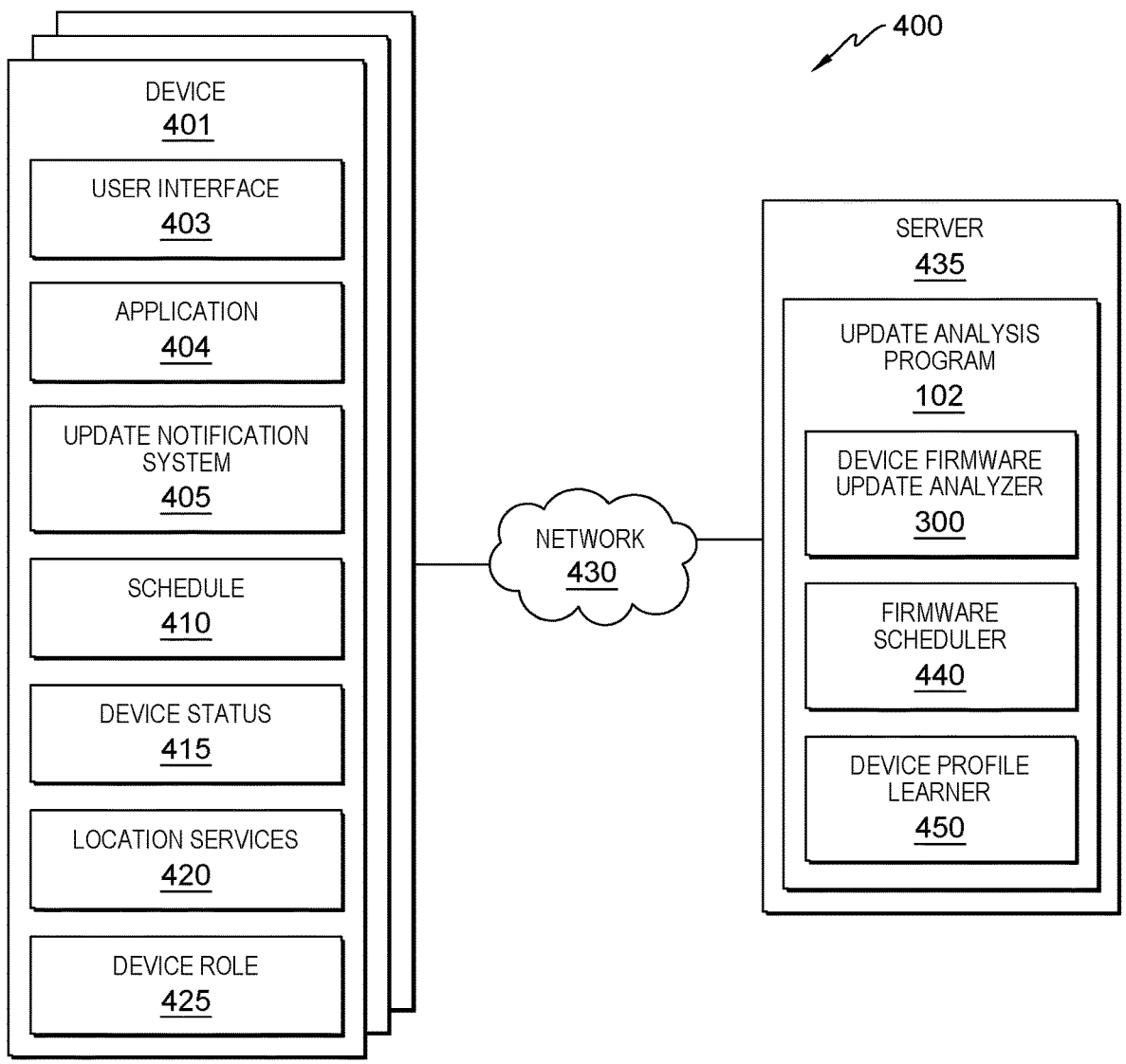
FIG. 4 is a functional block diagram of a computing system, generally designated 400, for scheduling an optimum time for a software update in accordance with at least one embodiment of the present invention.

FIG. 4 is a functional block diagram of a computing system, generally designated 400, for scheduling an optimum time for a software update in accordance with at least one embodiment of the present invention. FIG. 4 provides an illustration of only one implementation and does not imply any limitations with regard to the environments in which different embodiments may be implemented. Many modifications to the depicted environment may be made by those skilled in the art without departing from the scope of the present invention as recited by the claims.

User device 401 may represent a computing device of a user, such as a laptop computer, a tablet computer, a netbook computer, a personal computer, a desktop computer, a personal digital assistant (PDA), a smart phone, a wearable devices (e.g., smart glasses, smart watches, e-textiles, AR headsets, etc.), or any programmable computer systems known in the art. Device 401 may represent one or more devices. In general, device 401 is representative of any electronic device or combination of electronic devices capable of executing computer readable program instructions.

Computing system 400 includes user device 401 and server 135, interconnected over network 430. User device 401 include user interface 403 and application 404. User interface 403 is a program that provides an interface between a user of an end user device, such as user device 401, and a plurality of applications that reside on the device (e.g., application 404). A user interface, such as user interface 403, refers to the information (such as graphic, text, and sound) that a program presents to a user, and the control sequences the user employs to control the program. A variety of types of user interfaces exist. In one embodiment, user interface 403 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 403 is a script or application programming interface (API).

Application 404 can be representative of one or more applications (e.g., an application suite) that operate on user device 401. In various example embodiments, application 404 can be an application located on a user device. In other embodiments, application 404 can be another mobile device application (e.g., a web browser, enterprise-specific messaging application, social media application, an application for updating the software, firmware, and or hardware levels of a device, etc.). For example, application 404 is a client-side application associated with server 435 (e.g., a client-side application associated with update analysis program 101).

In an additional embodiment, application 404 can operate to perform processing steps of update analysis program 102 (i.e., application 404 can be representative of update analysis program 102 operating on user device 401), in accordance with various embodiments of the present invention. For example, a user of user device 401 can receive update reminders, view software, firmware, and/or hardware updates scheduled for a user's device, select particular updates, and approve, deny, and cancel scheduled updates utilizing application 404.

User devices 401 further include update notification system 405, schedule 410, device status 415, location services 420, and device role 425. In an embodiment, update notification system 405 is a component or sub-program of update analysis program 102 used to alert user device 401 that an update is available. In some embodiments, the alert by update notification system 405 can be a pop-up window or drop-down box. In an embodiment, schedule 410 further includes user devices 401 historical screen usage. For example, if a user device is typically in use from 2 pm-5 pm every Wednesday, update analysis program 102 will store this information in schedule 410. In an embodiment, schedule 410 contains the historical charge level of user device 401. One skilled in the art will appreciate schedule 410 may contain the user's schedule (calendar) for one or more user devices 401.

In an embodiment, device status 415 includes various performance conditions of a user device, such as the device charge level and Wi-Fi status. In an embodiment, the charge level indicates what percentage of battery a device has. In an embodiment, the charge level indicates if a device is currently charging. In an embodiment, the charge level indicates if the battery level is above a predetermined threshold level required for completing a particular update. In an embodiment, device status 415 includes the historical usage of the device and the historical charging times of the device. In an embodiment, the Wi-Fi status can be categorized by the strength of the Wi-Fi connection of user device 401 to Wi-Fi. In an embodiment, location services 420 includes various location information for the current and future locations of a user device. In an embodiment, device role 425 includes various information about a particular user device, including whether the device is an admin device or child device.

Server 435 includes update analysis program 102, which further includes, device firmware update analyzer 300, firmware scheduler 440, and device profile learner 450. In an embodiment, program 102 is a sub-program of program 101. In an embodiment, program 102 is distinct or separate from program 101. In an embodiment, device firmware update analyzer 300 is a module or sub-program of update analysis program 102 used to analyze firmware updates. In an embodiment, device firmware update analyzer 300 combines the administrator schedule with the availability of the server with the availability information (described below in further detail with respect to FIG. 5) of one or more user devices 401 to determine whether a particular user device 401 requires an update, and if an update is required, whether the update is permissible.

In an embodiment, firmware scheduler 440 is a module or sub-program of update analysis program 102 used to schedule updates on a user device. In an embodiment, firmware scheduler 440 schedules and stores firmware update reminders on schedule 410. In an embodiment, firmware scheduler 440 schedules and stores firmware update reminders within schedule 410 of user device 401.

In an embodiment, device profile learner 450 is a module or sub-program of update analysis program 102 that determines the firmware or hardware levels of user device 401 for performing updates. In an embodiment, device profile learner 450 determines the available times of user device 401. Further embodiments of device profile learner are described in further detail below with respect to FIG. 6.

In an embodiment, user device 401 may require a software update, firmware update, and/or hardware update. In an embodiment, update analysis program 102 analyzes schedule 410, device status 415, location services 420, and device role 425 to determine an optimum time to update software on user device 401. In an embodiment, update analysis program 102 determines an optimum time to update software based on a plurality of factors, including, but not limited to, one or more of: the device users schedule, usage history of the device, screen time history of the device, current location of the device, future location of the device, charge history of the device, current charge level of the device, Wi-Fi connectivity history of the device, and current Wi-Fi connectivity of the device. In an embodiment, update analysis program 102 determines a time to perform the software update when it is likely the device will not be in use, will have a sufficient charge level, and sufficient Wi-Fi connectivity. In an embodiment, once such an optimum time is determined, update analysis program 102 schedules the date and time of such update on schedule 410.

In an embodiment, a user may need assistance updating the software, firmware, and/or hardware on their device. Accordingly, update analysis program 102 may determine whether the device that requires the update is an admin device or a child device. In an embodiment, update analysis program 102 will schedule a software update for a child device when both the admin device and child device are available. In an embodiment, update analysis program 102 links an admin device to one or more child devices. In an embodiment, update analysis program 102 notifies an admin device of available update times for one or more child devices. In an embodiment, update analysis program 102 updates a family of mobile devices.

In an embodiment, update analysis program 102 determines multiple optimum times for a user device update. Here, update analysis program 102 may assign a score for each available time. In an embodiment, update analysis program 102 performs an update automatically on one or more user devices at the scheduled optimum time based on prior learning from pervious update attempts and/or previous completed update times.

In an embodiment, update analysis program 102 determines there is not an overlapping available time between the child schedule and the admin schedule. In an embodiment, the child schedule is the schedule of the user device requiring the update and the admin schedule is the schedule of the user device assisting in the update. For example, update analysis program 102 may determine there is not an overlap between the child schedule and the admin schedule when either schedule indicates there is a calendar event at that time. If no overlapping time is initially indicated, update analysis program 102 increases the amount of overlap time. For example, if update analysis program 102 determined there were no overlapping available times on January $4^{th}$, update analysis program 102 then increases the overlap time to two days to determine if there are overlapping available times on January $4^{th}$ and January $5^{th}$.

Figure 5:
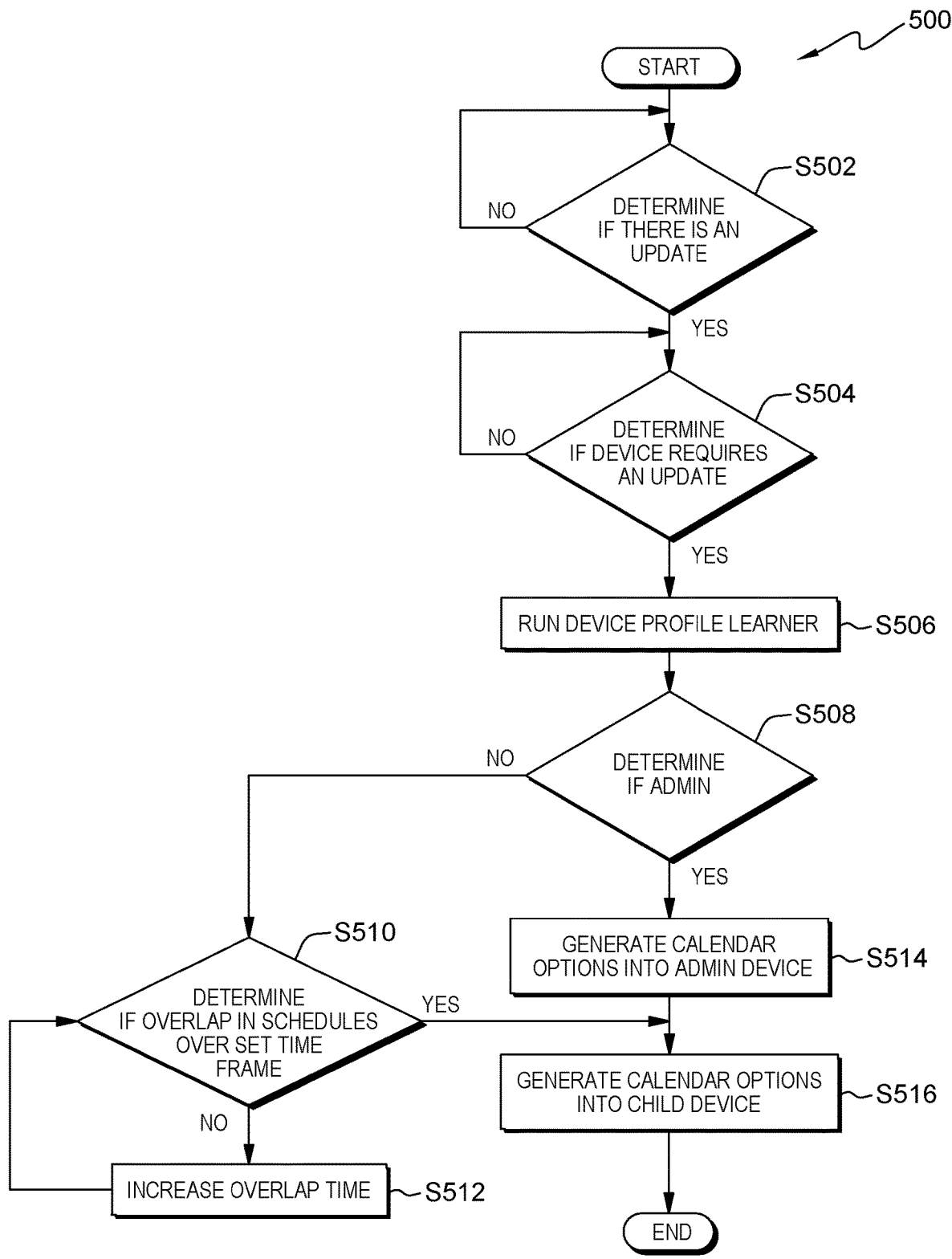
FIG. 5 is a flow chart diagram depicting operational steps for generating calendar options for a child device in accordance with at least one embodiment of the present invention.

FIG. 5 is a flow chart diagram depicting operational steps for generating calendar options for a child device, generally designated 500, in accordance with at least one embodiment of the present invention. FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

At decision step S502, update analysis program 102 determines if there is an update available. If it is determined there is not an update available (decision step S502 "NO" branch), update analysis program 101 returns to step S502. If it is determined there is an update available (decision step S502 "YES" branch), update analysis program 102 proceeds to decision step S504.

At decision step S504, update analysis program 102 determines if a user device requires an available update (e.g., software, firmware, and/or hardware update). In an embodiment, update analysis program 102 determines that a user device does not require an update if the hardware or firmware of the device cannot support the available update. If it is determined the device does not require the update (decision step S504 "NO" branch), update analysis program 102 returns to step S504. If it is determined there is an update available (decision step S504 "YES" branch), update analysis program 102 proceeds to step S506.

At step S506, update analysis program 102 runs device profile learner. Embodiments of the device profile learner are further explained in greater detail below with reference to FIG. 6.

At decision step S508, update analysis program 102 determines if there is an admin device to aid in updating a child device. If it is determined there is not an admin device (decision step S508 "NO" branch), update analysis program 101 proceeds to step S510. If it is determined there is an admin device (decision step S508 "YES" branch), update analysis program 102 proceeds to step S514.

At decision step S510, update analysis program 102 determines if there is an overlap in schedules over a predetermined time frame. If it is determined there is not an overlap in schedules over the predetermined time frame (decision step S510 "NO" branch), update analysis program 102 proceeds to step S512. If it is determined there is an overlap in schedules over set time frame (decision step S510 "YES" branch), update analysis program 102 proceeds to step S516.

At step S512, update analysis program 102 increases overlap time. In an embodiment, update analysis program 102 can increase the amount of time in the time frame. For example, if update analysis program 102 detects not long enough consecutive periods of time for both the server admin device and child device to complete the update, then the acceptable period of time in which the update can be performed is increased to determine if there is an overlap between the admin device and child device at another future period of time. If it is determined the future period of time for which an update is to be completed is increased and no acceptable overlapping period of time to complete the update is found, update analysis program 102 may perform a force update on child device.

At step S514, update analysis program 102 generates calendar options to the admin device. In an embodiment, update analysis program 102 stores the available update time on the admin device's calendar.

At step S516, update analysis program 102 generates calendar options to the child device. In an embodiment, update analysis program 102 stores the available update time on the child device's calendar.

Figure 6:
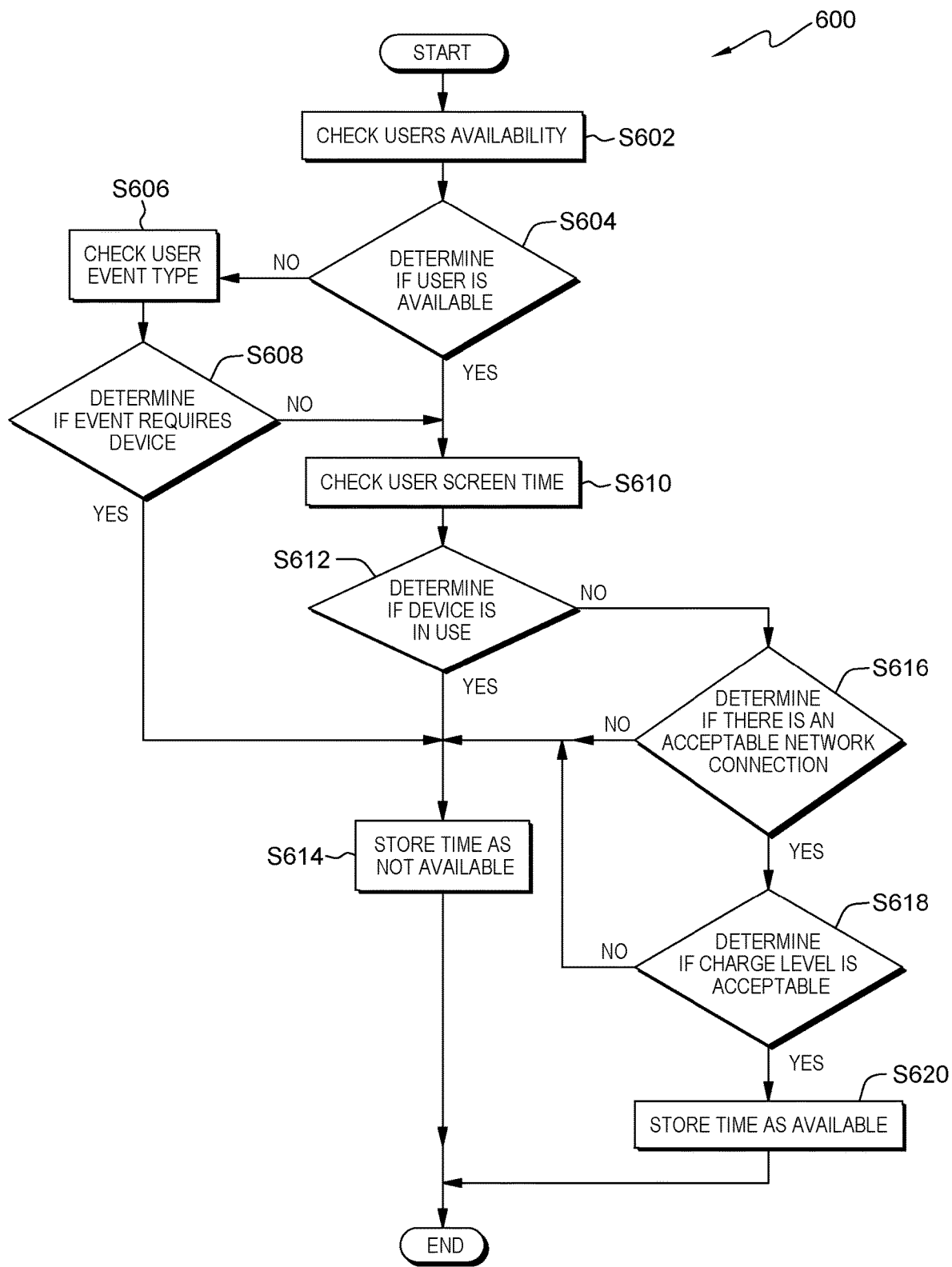
FIG. 6 is a flow chart diagram depicting operational steps for scheduling a software update in accordance with at least one embodiment of the present invention.

FIG. 6 is a flow chart diagram depicting operational steps for scheduling a user device update, generally designated 600, in accordance with at least one embodiment of the present invention. FIG. 6 provides only an illustration of one implementation and does not imply any limitations with regard to the environments in which different embodiments may be implemented. Many modifications to the depicted environment may be made by those skilled in the art without departing from the scope of the invention as recited by the claims.

At step S602, update analysis program 102 determines the device user's availability. In an embodiment, update analysis program 102 determines the device user's availability based on schedule 410.

At decision step S604, update analysis program 102 determines if the user is available. For example, update analysis program 102 may determine whether the user is available if the device update requires user input, such as entering a password, accepting or denying the update, selecting various user options during the update, etc. If it is determined the user is not available (decision step S604 "NO" branch), update analysis program 102 proceeds to step S606. If it is determined the user is available (decision step S604 "YES" branch), update analysis program 102 proceeds to step S610.

At step S606, update analysis program 102 determines the user event type. In an embodiment, update analysis program 102 determines the type of calendar event. For example, update analysis program 102 determines if the calendar event is a work meeting, doctors' appointment, or lunch. In an embodiment, update analysis program 102 determines the user event type by the location designated on the calendar event. In an embodiment, update analysis program 102 prompts user to indicate the event type.

At decision step S608, update analysis program 102 determines if the user event requires use of the device. For example, update analysis program 102 determines the user event is a doctor's appointment and does not require the device. In another example, update analysis program 102 determines the user event is a work meeting which requires the device. In an embodiment, update analysis program 102 determines if the user event requires the use of the device by the location designated on the calendar event with location services 420. In an embodiment, update analysis program 102 determines if the user event requires the use of the device location tracking the device. For example, if update analysis program 102 determines the device is at a coffee shop, update analysis program 102 may determine the event does not require use of the device. In an embodiment, update analysis program 102 prompts user to indicate whether or not they require their device for an event. In an embodiment, update analysis program 102 accesses historical use of the device for similar event types to determine if the user event requires use of the device. If it is determined the event does not require the device (decision step S608 "NO" branch), update analysis program 102 proceeds to step S610. If it is determined the event requires the device (decision step S608 "YES" branch), update analysis program 102 proceeds to step S614.

At step S610, update analysis program 102 analyzes the device user's screen time. In an embodiment, update analysis program 102 determines if a user historically uses their device at a particular time. For example, update analysis program 102 determines if a user historically uses their device at 6 pm on Tuesdays.

At decision step S612, update analysis program 102 determines if the user device is currently in use. In an embodiment, a device is in use if the user is currently using the device. In an embodiment, a device is in use if an application is running on the device. In an embodiment, a device is in use if data is being transmitted to the device and/or from the device. If it is determined the device is in use (decision step S612 "YES" branch), update analysis program 102 proceeds to step S614. If it is determined the device is not in use (decision step S612 "NO" branch), update analysis program 102 proceeds to decision step S616.

At decision step S616, update analysis program 102 determines if there is an acceptable network connection. In an embodiment, an acceptable network connection is network speed above a predetermined threshold level for performing a particular update. In an embodiment, an acceptable network connection is network bandwidth above a predetermined threshold level for performing a particular update. If it is determined there is not an acceptable network connection (decision step S616 "NO" branch), update analysis program 102 proceeds to step S614. If it is determined the device has acceptable network connection (decision step S616 "YES" branch), update analysis program 102 proceeds to decision step S618.

At decision step S618, update analysis program 102 determines if a user device charge level is acceptable. In an embodiment, an acceptable charge level is determined based, at least in part, on a percentage of remaining battery life being above a predetermined threshold level for performing a particular update. In an embodiment, an acceptable charge level is further determined based on the amount of power consumed during a particular update. In an embodiment, an acceptable charge level is further determined based on the type of battery, age of the battery, and historical battery use data of a particular user device. If it is determined there is not an acceptable charge level (decision step S618 "NO" branch), update analysis program 102 proceeds to step S614. If it is determined the device has an acceptable charge level (decision step S618 "YES" branch), update analysis program 102 proceeds to step S620.

At step S614, update analysis program 102 marks the predetermined period of time for updating the user device as not available in firmware scheduler 440.

At step S620, update analysis program 102 marks the predetermined period of time for updating the user device as available in firmware scheduler 440.

Figure 7:
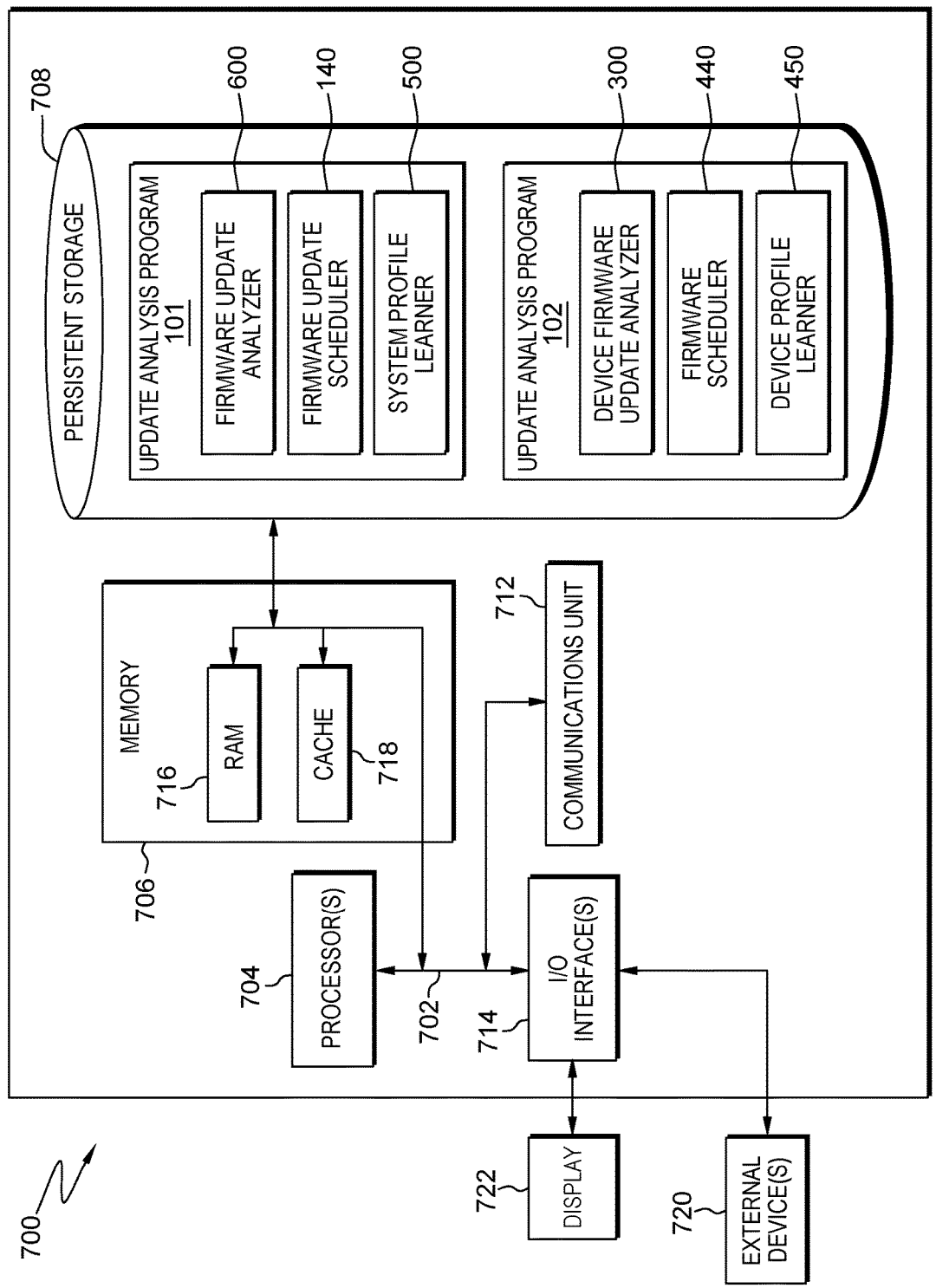
FIG. 7 is a block diagram depicting components of a computer, generally designated 700, suitable for executing an update analysis program 101 in accordance with at least one embodiment of the present invention.

FIG. 7 is a block diagram depicting components of a computing device, generally designated 700, suitable for executing update analysis program 101 and update analysis program 102 in accordance with at least one embodiment of the invention. Computing device 700 includes one or more processor(s) 704 (including one or more computer processors), communications fabric 702, memory 706 including, RAM 716 and cache 718, persistent storage 708, which further includes update analysis program 101, including firmware update analyzer 600, firmware update scheduler 140, and system profile learner 500 and update analysis program 102, including device firmware update analyzer 300, firmware scheduler 440, and device profile learner 450, communications unit 712, I/O interface(s) 714, display 722, and external device(s) 720. It should be appreciated that FIG. 7 provides only an illustration of one embodiment and does not imply any limitations with regard to the environments in which different embodiments may be implemented. Many modifications to the depicted environment may be made.

As depicted, computing device 700 operates over communications fabric 702, which provides communications between computer processor(s) 704, memory 706, persistent storage 708, communications unit 712, and input/output (I/O) interface(s) 714. Communications fabric 702 can be implemented with any architecture suitable for passing data or control information between processor(s) 704 (e.g., microprocessors, communications processors, and network processors), memory 706, external device(s) 720, and any other hardware components within a system. For example, communications fabric 702 can be implemented with one or more buses.

Memory 706 and persistent storage 708 are computer readable storage media. In the depicted embodiment, memory 706 includes random-access memory (RAM) 716 and cache 718. In general, memory 706 can include any suitable volatile or non-volatile one or more computer readable storage media.

Program instructions for update analysis program 101 and update analysis program 102 can be stored in persistent storage 708, or more generally, any computer readable storage media, for execution by one or more of the respective computer processor(s) 704 via one or more memories of memory 706. Persistent storage 708 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 712, in these examples, provides for communications with other data processing systems or devices. In these examples, communications unit 712 can include one or more network interface cards. Communications unit 712 may provide communications through the use of either or both physical and wireless communications links. In the context of some embodiments of the present invention, the source of the various input data may be physically remote to computing device 700 such that the input data may be received, and the output similarly transmitted via communications unit 712.

I/O interface(s) 714 allows for input and output of data with other devices that may operate in conjunction with computing device 700. For example, I/O interface(s) 714 may provide a connection to external device(s) 720, which may be as a keyboard, keypad, a touch screen, or other suitable input devices. External device(s) 720 can also include portable computer readable storage media, for example thumb drives, portable optical or magnetic disks, and memory cards. Software and data used to practice embodiments of the present invention can be stored on such portable computer readable storage media and may be loaded onto persistent storage 708 via I/O interface(s) 714. I/O interface(s) 714 also can similarly connect to display 722. Display 722 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
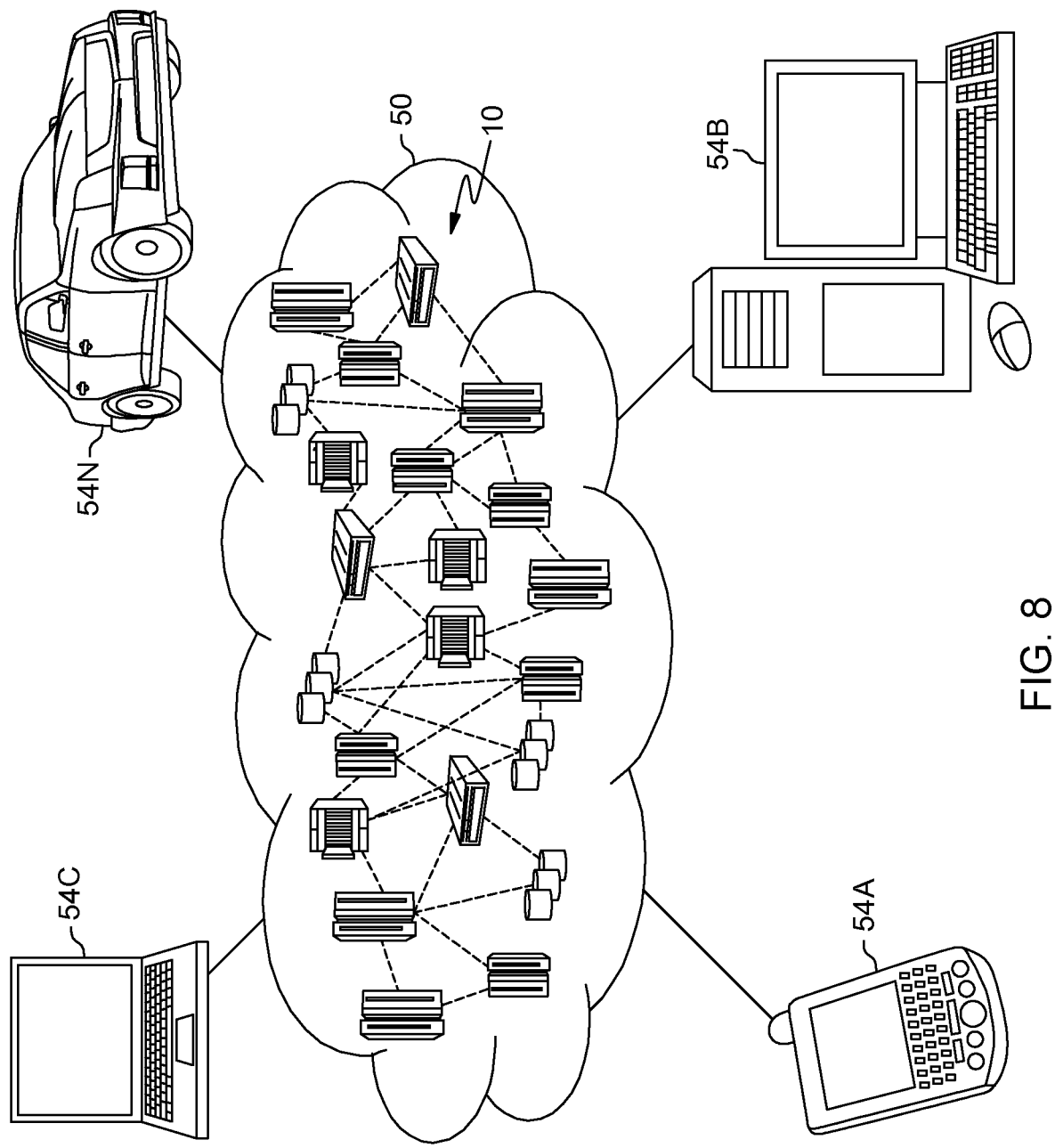
FIG. 8 is a cloud computing environment according to an embodiment of the present invention.

FIG. 8 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
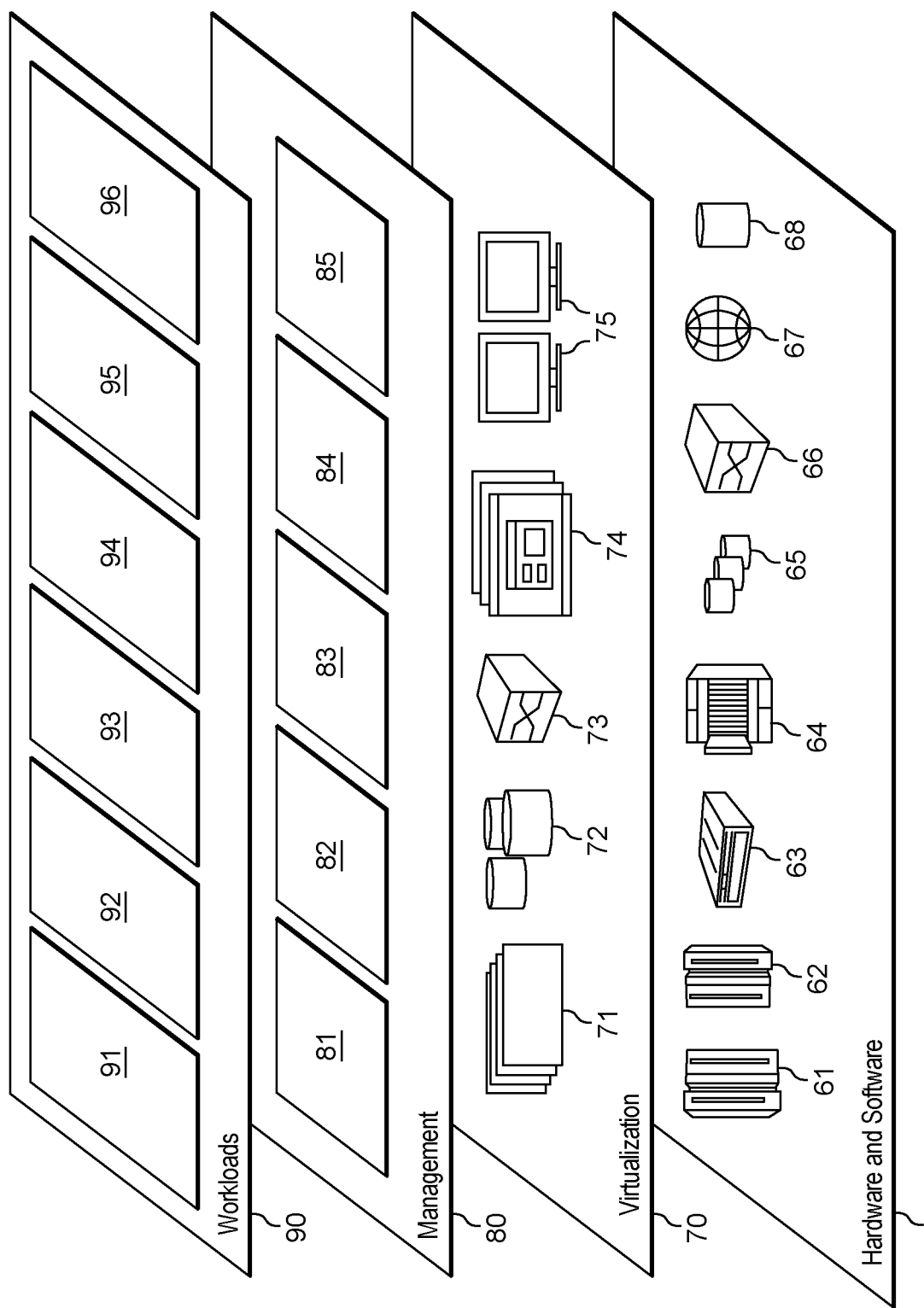
FIG. 9 is abstraction model layers according to an embodiment of the present invention.

FIG. 9 is block diagram depicting a set of functional abstraction model layers provided by cloud computing environment 50 depicted in FIG. 9 in accordance with at least one embodiment of the present invention. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and device update processing 96.

What is claimed is:

1. A computer-implemented method for updating a device, comprising:
   identifying that a firmware sub-stream update associated with the device is available;
   determining whether the firmware sub-stream update associated with the device is permitted; and
   automatically performing at an optimal scheduled time, in response to the firmware sub-stream update associated with the device not being permitted based, at least in part, on a particular piece of down-level hardware targeted by the firmware sub-stream update, an alternate available firmware sub-stream update on the device that does not target the particular piece of down-level hardware.

2. The computer-implemented method of claim 1, further comprising determining the optimal scheduled time for performing the firmware sub-stream update on the device based, at least in part, on:
   determining a mutually available time for the device and one or more additional devices whose workload is interdependent on the device being available.

3. The computer-implemented method of claim 2, wherein determining the optimal scheduled time for performing the firmware sub-stream update on the device is further based on analyzing at least one of historical availability of the device for performing updates or historical update times at which updates were performed on the device.

4. The computer-implemented method of claim 2, wherein determining the optimal scheduled time for performing the firmware sub-stream update on the device is further based on:
  determining a mutually available time for the device to perform the firmware sub-stream update and an administrator device to provide the firmware sub-stream update to the device.

5. The computer-implemented method of claim 2, wherein determining the optimal scheduled time for performing the firmware sub-stream update on the device is based on: (i) a user of the device's calendar, (ii) an administrator devices schedule, (iii) the device's workload, (iv) additional devices having respective workloads that are dependent on the device; (v) the devices battery charge level being above a predetermined level, (vi) the devices historical screen time data, and (vii) network.

6. The computer-implemented method of claim 1, wherein the device is at least one of a mobile device or a server.

7. A computer program product for updating a device, the computer program product comprising one or more computer readable storage media and program instructions stored on the one or more computer readable storage media, the program instructions including instructions to:
  identify that a firmware sub-stream update associated with the device is available;
  determine whether the firmware sub-stream update associated with the device is permitted; and
  automatically performing at an optimal scheduled time, in response to the firmware sub-stream update associated with the device not being permitted based, at least in part, on a particular piece of down-level hardware targeted by the firmware sub-stream update, an alternate available firmware sub-stream update on the device that does not target the particular piece of down-level hardware.

8. The computer program product of claim 7, further comprising instructions to determine the optimal scheduled time for performing the firmware sub-stream update on the device based, at least in part, on:
  determine a mutually available time for the device and one or more additional devices whose workload is interdependent on the device being available.

9. The computer program product of claim 8, wherein the instructions to determine the optimal scheduled time for performing the firmware sub-stream update on the device is further based on instructions to analyze at least one of historical availability of the device for performing updates or historical update times at which updates were performed on the device.

10. The computer program product of claim 8, wherein the program instructions to determine the optimal scheduled time for performing the firmware sub-stream update on the device is further based on instructions to:
  determine a mutually available time for the device to perform the firmware sub-stream update and an administrator device to provide the firmware sub-stream update to the device.

11. The computer program product of claim 8, wherein determining the optimal scheduled time for performing the firmware sub-stream update on the device is based on: (i) a user of the device's calendar, (ii) an administrator devices schedule, (iii) the device's workload, (iv) additional devices having respective workloads that are dependent on the device; (v) the devices battery charge level being above a predetermined level, (vi) the devices historical screen time data, and (vii) network.

12. The computer program product of claim 7, wherein the device is at least one of a mobile device or a server.

13. A computer system for updating a device, comprising:
  one or more computer processors;
  one or more computer readable storage media; and
  computer program instructions, the computer program instructions being stored on the one or more computer readable storage media for execution by the one or more computer processors, the computer program instructions including instructions to:
    identify that a firmware sub-stream update associated with the device is available;
    determine whether the firmware sub-stream update associated with the device is permitted; and
    automatically perform at an optimal scheduled time, in response to the firmware sub-stream update associated with the device not being permitted based, at least in part, on a particular piece of down-level hardware targeted by the firmware sub-stream update.

14. The computer system of claim 13, further comprising instructions to determine the optimal scheduled time for performing the firmware sub-stream update on the device based, at least in part, on:
  determine a mutually available time for the device and one or more additional devices whose workload is interdependent on the device being available.

15. The computer system of claim 14, wherein the instructions to determine the optimal scheduled time for performing the firmware sub-stream update on the device is further based on instructions to analyze at least one of historical availability of the device for performing updates or historical update times at which updates were performed on the device.

16. The computer system of claim 14, wherein the program instructions to determine the optimal scheduled time for performing the firmware sub-stream update on the device is further based on instructions to:
  determine a mutually available time for the device to perform the firmware sub-stream update and an administrator device to provide the firmware sub-stream update to the device.

\* \* \* \* \*